US008892590B2

(12) United States Patent
Schneider

(10) Patent No.: US 8,892,590 B2
(45) Date of Patent: Nov. 18, 2014

(54) SEARCH PREDICTION USING CONTEXT MODELING

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 640 days.

(21) Appl. No.: 12/790,962

(22) Filed: May 31, 2010

(65) Prior Publication Data

US 2011/0295824 A1   Dec. 1, 2011

(51) Int. Cl.
*G06F 17/30* (2006.01)
(52) U.S. Cl.
CPC .... *G06F 17/30442* (2013.01); *G06F 17/30427* (2013.01); *G06F 17/3064* (2013.01)
USPC .......................................... 707/767; 707/734
(58) Field of Classification Search
CPC .................................................. G06F 17/3064
USPC ............................................... 707/734, 767
See application file for complete search history.

(56) References Cited

U.S. PATENT DOCUMENTS

| | | | | |
|---|---|---|---|---|
| 6,539,377 | B1 * | 3/2003 | Culliss | 707/999.005 |
| 6,745,178 | B1 * | 6/2004 | Emens et al. | 707/741 |
| 6,772,150 | B1 | 8/2004 | Whitman et al. | |
| 2009/0083126 | A1 * | 3/2009 | Koren et al. | 705/10 |
| 2010/0131542 | A1 | 5/2010 | Schneider | |
| 2011/0202522 | A1 * | 8/2011 | Ciemiewicz et al. | 707/711 |

OTHER PUBLICATIONS

Kwok-Wai Cheung et al., "Mining Customer Product Ratings for Personalized Marketing", 35 Decision Support Systems (2003), pp. 231-243.*
Janet Webster et al., "Collaborative Filtering: A New Approach to Searching Digital Libraries", New Review of Information Networking, vol. 10, No. 2 (2004), pp. 177-191.*
Kazunari Sugiyama et al., "Adaptive Web Search Based on User Profile Constructed without Any Effort from Users", ACM WWW '04 (2004), pp. 675-684.*
Greg Linden, "People Who Read This Article Also Read", IEEE Spectrum, Mar. 2008, pp. 46-60.*
Gloria Chatzopoulou et al., "Query Recommendations for Interactive Database Exploration", SSDBM 2009, LNCS 5566 (2009), pp. 3-18.*
Darlene Cavalier, Prize-Driven Research Takes Off, Discover Magazine, p. 65, Jan./Feb. 2010 issue.

* cited by examiner

*Primary Examiner* — Rehana Perveen
*Assistant Examiner* — Scott A Waldron
(74) *Attorney, Agent, or Firm* — Lowenstein Sandler LLP

(57) ABSTRACT

A method and apparatus for predicting search queries for a user on a search-based system is described. A search engine tracks search queries from a user received at the search engine. A prediction engine compares a search query history from the user with search query histories from other users on the search engine. The search query histories are stored in a storage device of the search-based system. A prediction of a search query for the user is generated based on the comparison. Search query histories from other users having greater similarities with the search query history from the user have a greater computation weight than search query histories from other users with less similarities with the search query history from the user.

14 Claims, 6 Drawing Sheets

SEARCH PREDICTION USING CONTEXT MODELING

TECHNICAL FIELD

Embodiments of the present invention relate to a search engine, and more particularly, to a search prediction engine.

BACKGROUND

Most behaviors interacting with network computing systems involve some form of searching. Often, a pattern of searches emerge that can be matched with similar patterns to provide a context for predicting subsequent search actions. These predictions in turn can be used to enhance the results of a current search.

BRIEF DESCRIPTION OF THE DRAWINGS

The present invention is illustrated by way of example, and not by way of limitation, in the figures of the accompanying drawings and in which.

DETAILED DESCRIPTION

A method and apparatus for predicting search queries for a user on a search-based system is described. A search engine tracks search queries from a user received at the search engine. A prediction engine compares a search query history from the user with search query histories from other users on the search engine. The search query histories are stored in a storage device of the search-based system. One or more predictions of search queries for the user is generated based on the comparison. Search query histories from other users having greater similarities with the search query history from the user have a greater computation weight than search query histories from other users with less similarities with the search query history from the user.

Figure 1:
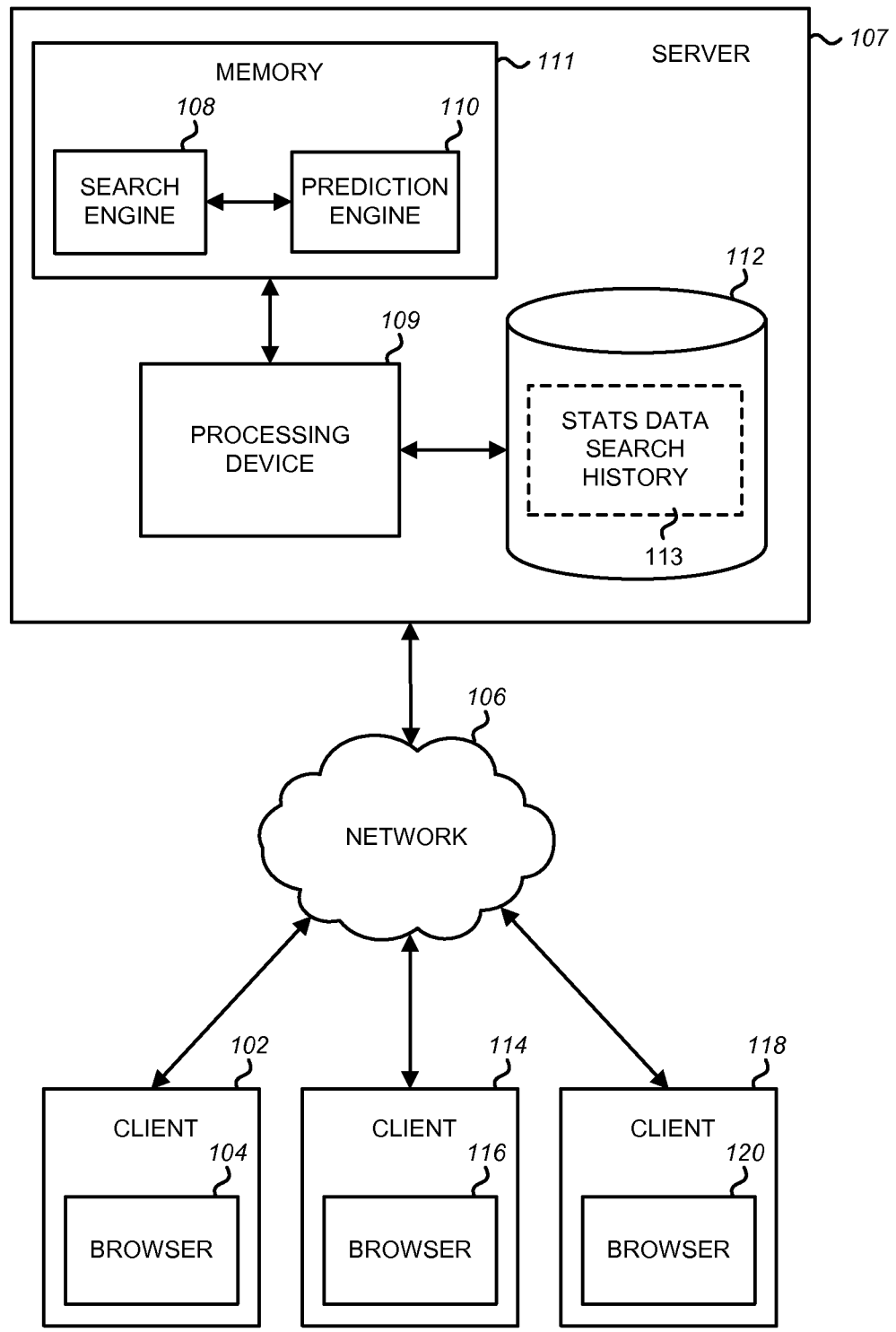
FIG. 1 is a block diagram illustrating one embodiment of a system for predicting search queries of a user.

FIG. 1 is a block diagram illustrating one embodiment of a server 107 for predicting search queries of a user. Server 107 may reside one or more computing devices such as a server computer, a desktop computer, and other computing devices. Server 107 provides a search-based system for clients 102. For example, clients 102, 114, 118 respectively communicate with server 107 with web browsers 104, 116, 120 through a communication network 106 (e.g. the Internet). As such, a server 107 associates a search query with a user. In one embodiment, session or tracking cookies can be used to identify the user.

In one embodiment, server 107 comprises a processing device 109 and a storage device 112. A memory 111 stores instructions for a search engine 108 and a prediction engine 110. The processing device 109 communicates with memory 111 and is configured to process and execute instructions based on the search engine 108 and the prediction engine 110. Storage device 112 stores data to be searched and search histories 113 from all registered users with server 107.

Processing device 109 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 109 may also be one or more special-purpose processing devices such as an application specific integrated circuit (ASIC), a field programmable gate array (FPGA), a digital signal processor (DSP), network processor, or the like. The processing device 109 is configured to execute the processing logic from search engine 108 and prediction engine 110 for performing the operations and steps discussed herein.

Search engine 108 is configured to receive and track search queries from a registered user. Prediction engine 110 is configured to compare a search query history from the user with search query histories from other users on search engine 108. Prediction engine 110 further generates a prediction of a search query for the registered user based on the comparison. In one embodiment, search query histories from other registered users having greater similarities with the search query history from the registered user have a greater computation weight than search query histories from other users with less similarities with the search query history from the user.

Storage device 112 may include a machine-accessible storage medium on which is stored one or more sets of instructions (e.g., software) embodying any one or more of the methodologies or functions described herein. The software may also reside, completely or at least partially, within a main memory and/or within the processing device 109 during execution thereof by the server 107.

While the machine-accessible storage medium is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention.

Figure 2:
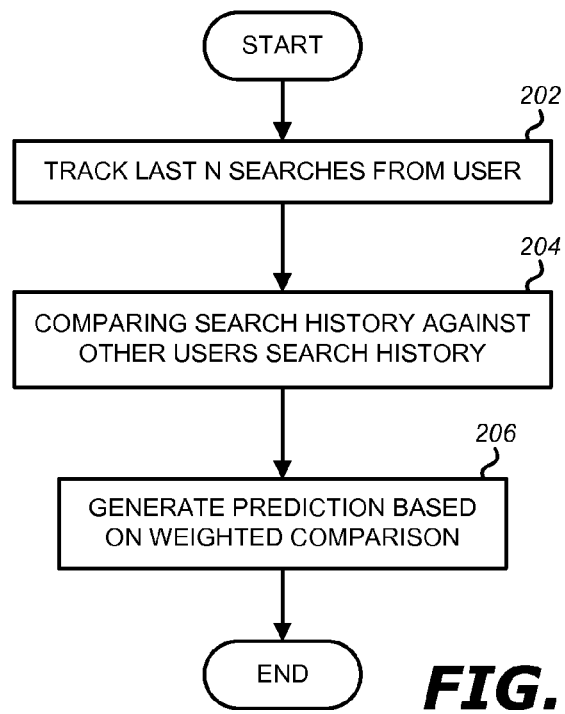
FIG. 2 is a flow diagram illustrating one embodiment of a method for predicting search queries of a user.

FIG. 2 is a flow diagram illustrating of one embodiment of a method for predicting search queries of a user. At 202, search queries from a user are received and tracked at a search engine of a search-based system. At 204, a search query history from the user is compared with search query histories from other users on the search engine. The search query histories are stored in a storage device of the search-based system. At 206, a prediction of a search query for the user is generated based on the comparison. Search query histories from other users having greater similarities with the search query history from the user have a greater computation weight than search query histories from other users with less similarities with the search query history from the user.

In one embodiment, the prediction of the search query for the user is generated by determining the number of common search queries between the search history of the user and the search history of each other users. The search query history of the user is associated with the search query history of at least one other user having the most number of common search queries. A new search query for the user is determined from the search query history of at least one other user having the most number of common search queries.

In another embodiment, the computation weight is adjusted based on the search histories from other users. The most recent search queries from the user have a greater computation weight than other search queries from the user. However, it should be noted that the match contexts from other user searches is not restricted to those other user's most recent searches; it is all of their prior search history, matched against the current user's recent search history at all of the places where such a match could occur. For example, if one of the users from the set of "other users" has a search history that can be encapsulated as "A B C D E F G H I J K L M N", and the current user has a recent search history of "D E F G", the context that matches is the set of searches beginning at "D"— in this case, the context is predicting that the current user will next search for "H".

Figure 3:
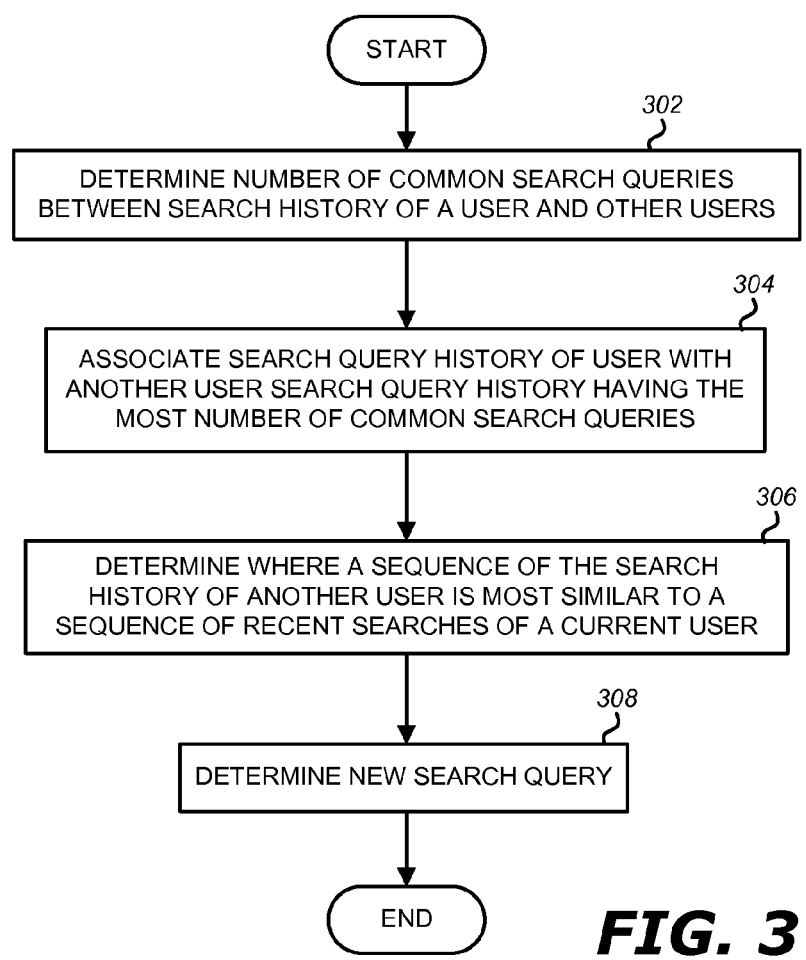
FIG. 3 is a flow diagram illustrating another embodiment of a method for suggesting new search queries.

FIG. 3 is a flow diagram illustrating another embodiment of a method for suggesting new search queries. At 302, prediction engine 110 determines the number of common search queries between the search history of a user and the search history of each other users. At 304, prediction engine 110 then associates the search query history of the user with the search query history of at least one other user having the most number of common search queries. At 306, prediction engine 110 determine where a test sequence (the sequence belonging to the current user) of the search history of the user is most similar to a reference sequence (the sequence belonging to another user) from at least one other user having the most number of common search queries. What follows where the test sequence's similarity with the reference sequence matches is the prediction being made by the reference sequence. In another embodiment, the prediction is based on a minimum threshold of similarities rather and the absolute most matches. The minimum threshold can be a predefined adjustable user-defined number.

At 308, prediction engine 110 can determine a new search query for the user from the search query history of at least one other user having the most number of common search queries. The new search query may also be referred to as the predicted search query for the user.

By contextually matching user search histories, the prediction engine can accurately predict a search query. If the search provider can track all of the searches of an individual, the search history can be matched against other users to determine how similar they are. Histories with greater similarity would have ore eight in future predictions. It should be noted that the computation weight is adjusted based on the search histories from other users. For efficiency, the prediction engine can cache the search results from a predicted search queries prior to selection of the search query by the user.

Figure 4:
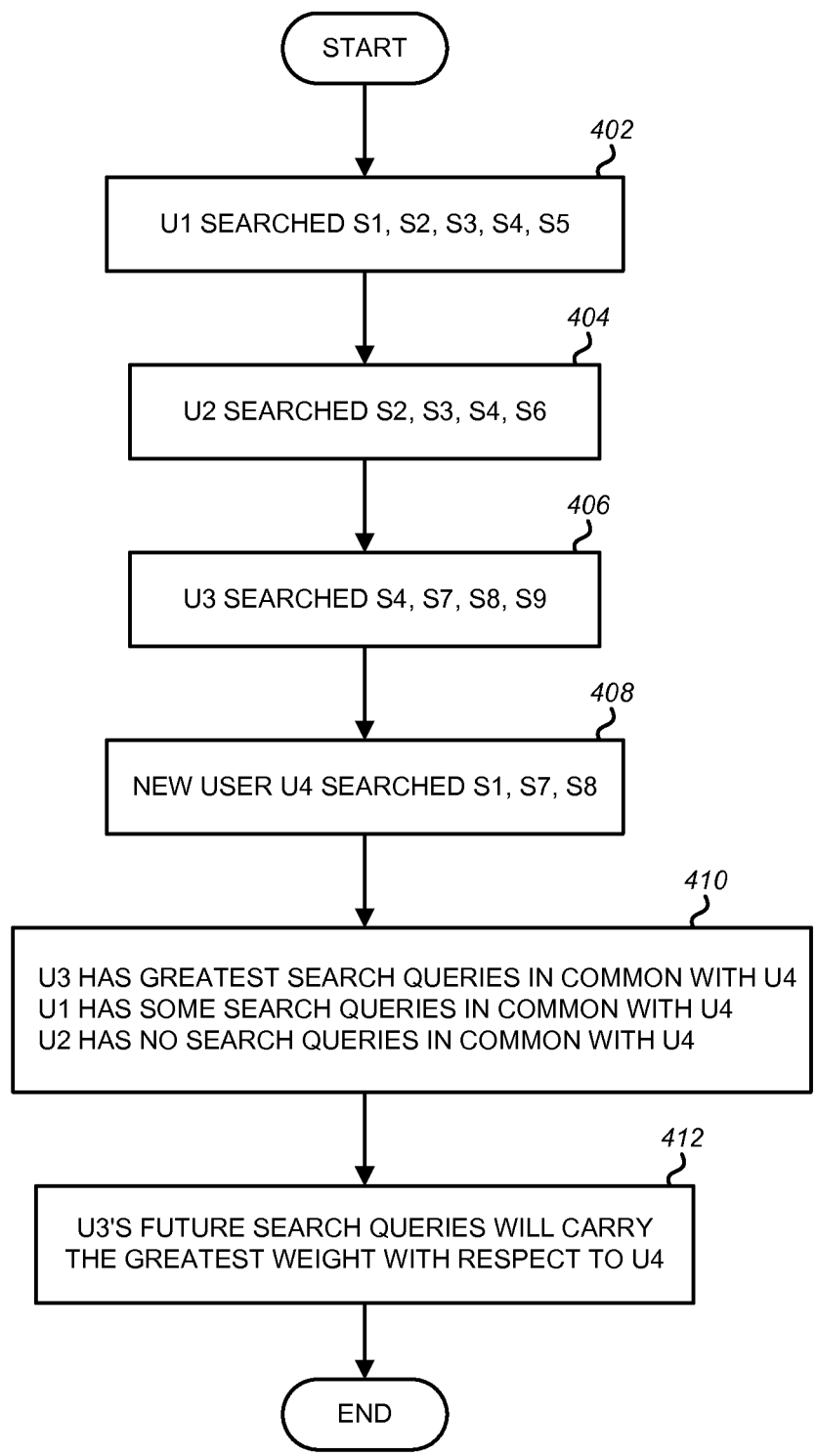
FIG. 4 is a flow diagram illustrating an example of a method for predicting a search query for a user.

Examples of the previously described method are illustrated in FIGS. 4, 5, 6, and 7. In the example of FIG. 4, at 402, the prediction engine looks up searches from user 1 (U1) and determines that U1 issued searches for S1, S2, S3, S4, and S5. S1 can be a search string or the name of an item searched for. At 404, the prediction engine looks up searches from user 2 (U2) and determines that U2 issued searches for S2, S3, S4, and S6. At 406, the prediction engine looks up searches from user 3 (U3) and determines that U3 issued searches for S4, S7, S8, and S9. At 408, the prediction engine determines that a new user U4 has searched for S1, S7, and S8.

At 410, the prediction engine determines that the new user U4 has the most similar searches with U3, some similar searches with U1, and no similar searches with U2. This kind of similarity would be found in the context constructed from user U4's most recent sequence of searches. As such, there would actually be no need to consider the similarities with U2 (since none of the searches overlapped). On the other hand, U3's future search queries will carry the greatest weight with respect to predicting searches for U4 at 412.

One of the benefits of the above method is better search result caching and better search relevance, both in terms of results provided and in terms of suggestions for additional search terms.

Figure 5:
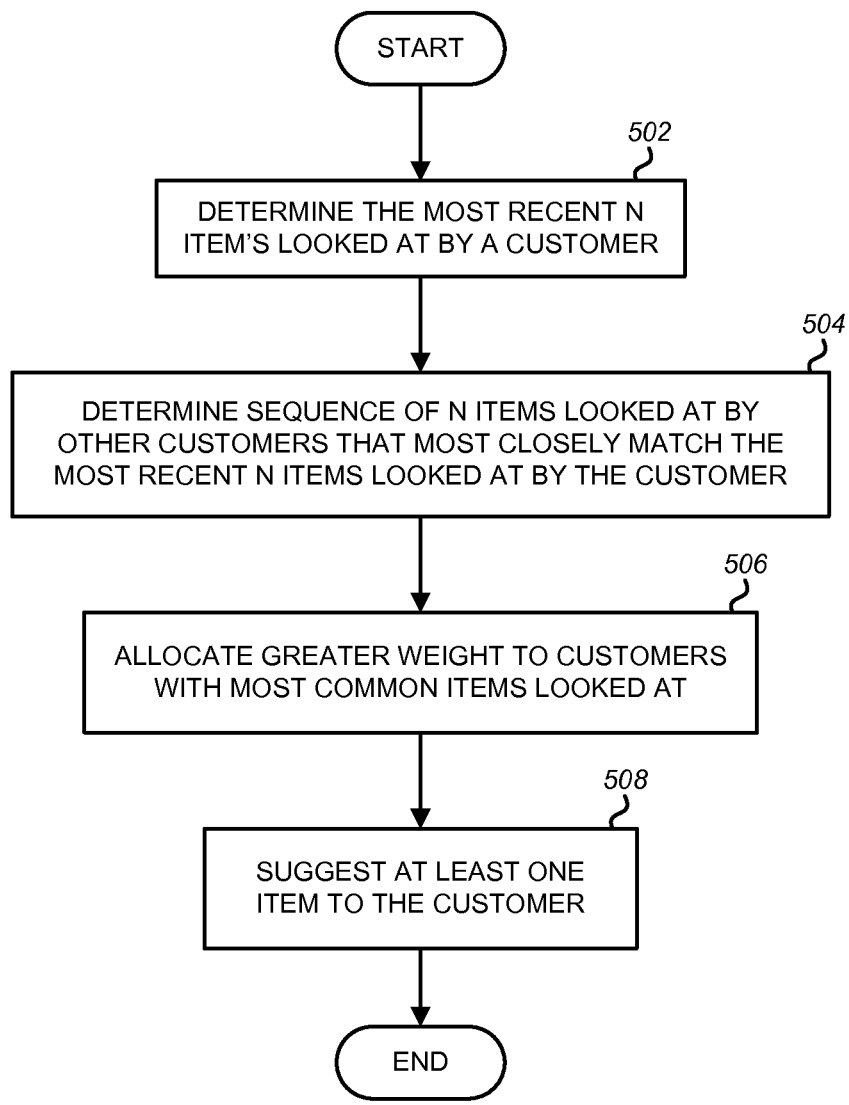
FIG. 5 is a flow diagram illustrating an example of a method for predicting a customer order preference.

In addition to search providers, this algorithm can also be used to predict customer order preferences as illustrated in FIG. 5. For example, the most recent N items looked at by an online customer are determined at 502. The sequence of N items looked at by other online customers that most closely match the most recent N items looked at by the customer are determined at 504. At 506, the prediction engine allocates a greater weight to other customers having the most common items looked at in relation to the online customer. At 508, the prediction engine can be used to predict based on the different items looked at and based on the different weights, items the online customer is most likely to buy. Those items could be featured prominently.

Figure 6:
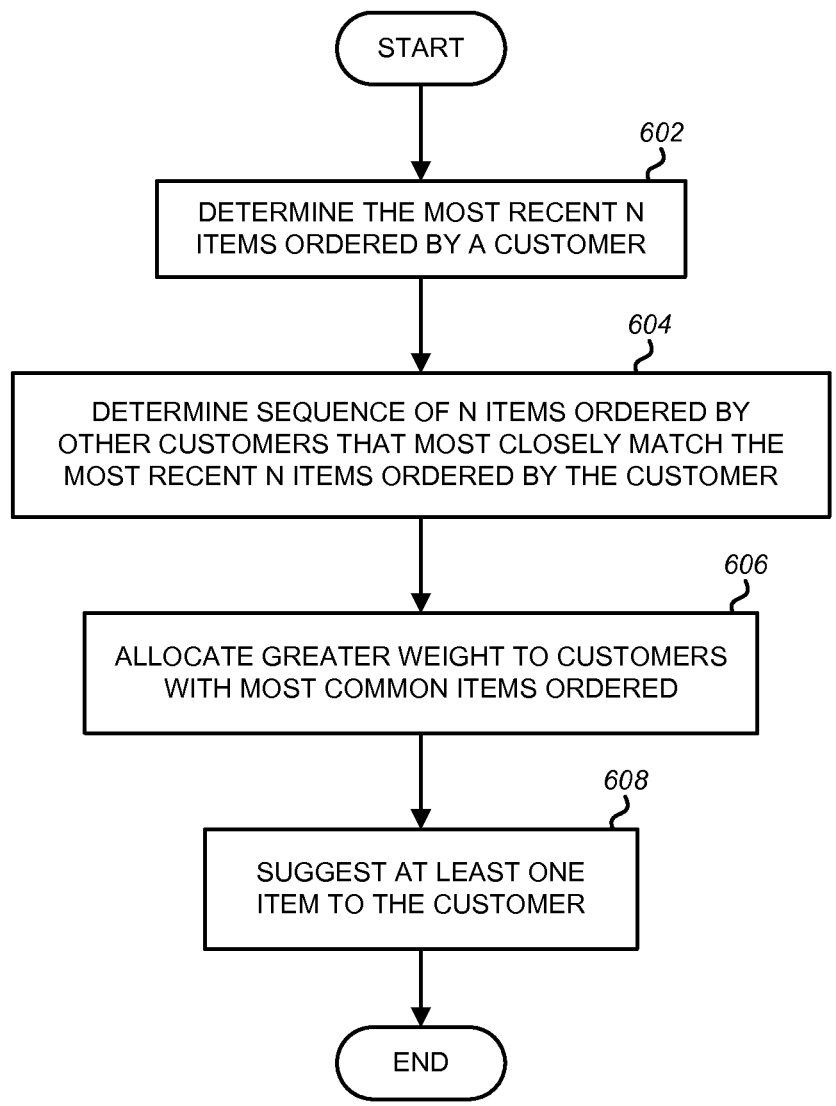
FIG. 6 is a flow diagram illustrating another example of a method for predicting a customer order preference.

FIG. 6 illustrates another example of a method for predicting and suggesting an item the online customer is most likely to buy. In this embodiment, the customer order preferences prediction could also be extended to sequences of purchases using a customer's most recent N orders to predict what they are likely to be interested in buying. At 602, the prediction engine determines the most recent N items ordered by a customer. At 604, the prediction engine is also used to determine a sequence of N items ordered by other customers of the same or different store that most closely match the most recent N items ordered by the customer. At 606, the prediction engine allocates a greater weight to other customers having the most common items bought in relation to the online customer. At 508, the prediction engine can be used to predict based on the different items and based on the different weights, items the online customer is most likely to buy.

This information could be immediately used to provide the customer with an opportunity to buy the item they are most likely to buy next. For example, that suggested item can be featured on the checkout page for an online merchant.

Figure 7:
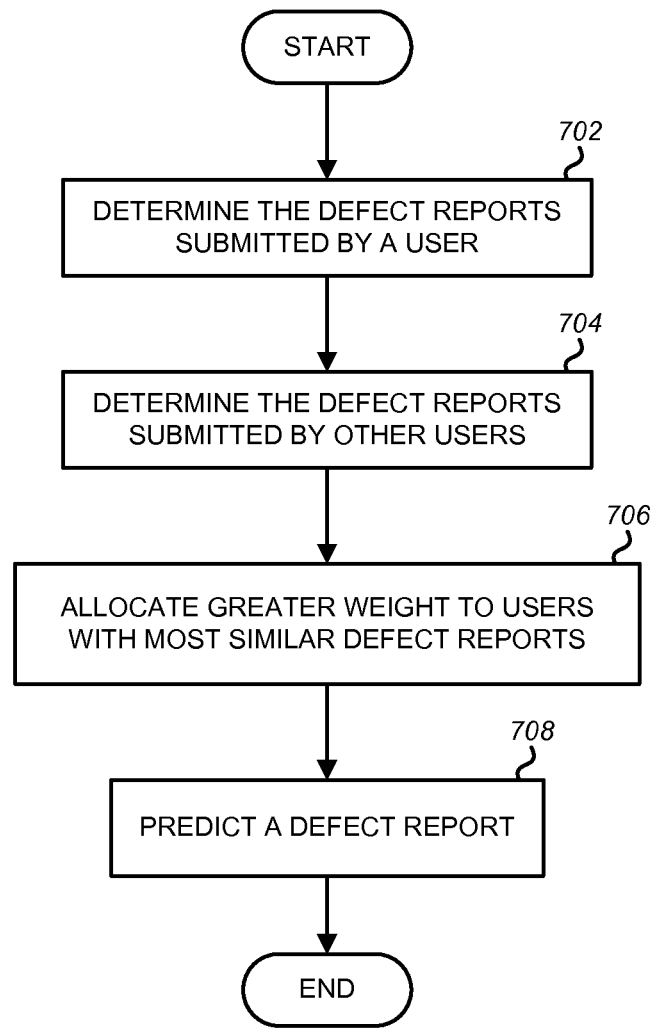
FIG. 7. is a flow diagram illustrating an example of a method for predicting a defect that is likely to occur in a system.

FIG. 7 illustrates another example of a method to predict breakdowns and maintenance needs. At 702, the prediction engine determines defect reports (as opposed to searches) submitted by a user. At 704, the prediction engine determines defect reports submitted by other users. At 706, the prediction engine allocates a greater weight to other users having the most similar defect reports.

At 708, the prediction engine can be used to predict based on the different defect reports and based on the different weights, defects, breakdowns, or maintenance needs, the user is most likely to encounter in a system. As such, the user could take preventative measures such as maintenance, replacement, or upgrade of a component of a system. The defect report may be reported to a system administrator. It should be noted that the mechanism of the server 107 can be broadly applied to the data processing and analysis inherent in the collection of event sequences, rather than being limited to the details of the events themselves.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   tracking search queries of a user of a search engine to generate a search query history;
   comparing the search query history of the user with search query histories of other users of the search engine;
   determining a number of common search queries between the search query history of the user and the search query history of each other user in view of the comparing;
   associating the search query history of the user with the search query history of at least one other user having the most number of common search queries;
   determining where a test sequence of the search query history of the user is most similar to a reference sequence of at least one other user having the most number of common search queries; and
   generating, by a processing device, a predicted search query for the user that the user is predicted to use to perform a next search in relation to other possible searches from the search query history of at least one other user having the most number of common search queries in view of the test sequence and the reference sequence, wherein the predicted search query is the next sequential predicted search relative to the reference sequence, and wherein the search query histories of the other users with greater similarities to the search query history of the user have a greater computation weight in generating the predicted search query than the search query histories of the other users with fewer similarities to the search query history of the user.

2. The method of claim 1 wherein tracking further comprises:
   storing a history of previous search queries of the user.

3. The method of claim 1 wherein the computation weight is adjusted in view of the search query histories of the other users.

4. The method of claim 1 further comprising:
   executing the predicted search query prior to selection of the predicted search query by the user; and
   caching the search results of the predicted search query prior to selection of the predicted search query by the user.

5. The method of claim 1 wherein the search queries of the user comprise orders placed by the user in view of results of the search queries.

6. A non-transitory computer-readable storage medium, having instructions stored therein, which when executed by a processing device, cause the processing device to perform operations comprising:
   tracking search queries of a user of a search engine to generate a search query history;
   comparing the search query history of the user with search query histories of other users of the search engine;
   determining a number of common search queries between the search query history of the user and the search query history of the other users in view of the comparing;
   associating the search query history of the user with the search query history of at least another user having a minimum threshold of search queries similarities;
   determining where a test sequence of the search query history of the user is most similar to a reference sequence from at least another user having the minimum threshold of search queries similarities; and
   generating, by the processing device, a predicted search query for the user that the user is predicted to use to perform a next search in relation to other possible searches from the search query history of at least another user having the minimum threshold of search queries similarities in view of the test sequence and the reference sequence, wherein the predicted search query is the next sequential predicted search relative to the reference sequence, and wherein the search query histories of the other users with greater similarities to the search query history of the user have a greater computation weight in generating the predicted search query than the search query histories of the other users with fewer similarities to the search query history of the user.

7. The non-transitory computer-readable storage medium of claim 6 wherein tracking further comprises:
storing a history of previous search queries of the user.

8. The non-transitory computer-readable storage medium of claim 6 wherein the computation weight is adjusted in view of the search query histories of the other users.

9. The non-transitory computer-readable storage medium of claim 6 wherein the operations further comprises:
executing the predicted search query prior to selection of the predicted search query by the user; and
caching the search results of the predicted search query prior to selection of the predicted search query by the user.

10. The non-transitory computer-readable storage medium of claim 6 wherein the search queries of the user comprise orders placed by the user in view of results of the search queries.

11. A computing system comprising:
a storage device to store search queries histories from all users of the computing system;
a processing device coupled to the storage device, the processing device comprising a search engine and a prediction engine,
the search engine to receive and track search queries of a user to generate a search query history,
the prediction engine to compare a search query history of the user with search query histories of other users of the search engine, to determine a number of common search queries between the search query history of the user and the search query history of each other user in view of the comparison, to associate the search query history of the user with the search query history of at least one other user having the most number of common search queries, to determine where a test sequence of the search query history of the user is most similar to a reference sequence from at least one other user having the most number of common search queries, and to generate a predicted search query for the user that the user is predicted to use to perform a next search in relation to other possible searches from the search query history of at least one other user having the most number of common search queries in view of the test sequence and the reference sequence, wherein the predicted search query is the next sequential predicted search relative to the reference sequence, and wherein the search query histories of other users with greater similarities to the search query history of the user have a greater computation weight in generating the predicted search query than search query histories of other users with fewer similarities to the search query history of the user.

12. The computing system of claim 11 wherein the computation weight is adjusted in view of the search query histories of the other users.

13. The computing system of claim 11, the prediction engine to execute the predicted search query prior to selection of the predicted search query by the user, and to cache the search results of the predicted search queries prior to selection of the predicted search query by the user.

14. The computing system of claim 11 wherein the search queries of the user comprise orders placed by the user in view of results of the search queries.

* * * * *